(12) United States Patent
Matlik et al.

(10) Patent No.: US 12,280,436 B2
(45) Date of Patent: Apr. 22, 2025

(54) CLAMPING DEVICE FOR TOOL HOLDER

(71) Applicant: AB SANDVIK COROMANT, Sandviken (SE)

(72) Inventors: Gunnar Matlik, Sandviken (SE); Jonas Wasterlund, Ichinomiya-cho Toyokawa (JP)

(73) Assignee: AB SANDVIK COROMANT, Sandviken (SE)

( * ) Notice: Subject to any disclaimer, the term of this patent is extended or adjusted under 35 U.S.C. 154(b) by 407 days.

(21) Appl. No.: 17/778,322

(22) PCT Filed: Nov. 16, 2020

(86) PCT No.: PCT/EP2020/082173
§ 371 (c)(1),
(2) Date: May 19, 2022

(87) PCT Pub. No.: WO2021/099230
PCT Pub. Date: May 27, 2021

(65) Prior Publication Data
US 2022/0347765 A1    Nov. 3, 2022

(30) Foreign Application Priority Data

Nov. 20, 2019    (EP) .................................... 19210465

(51) Int. Cl.
*B23B 31/26*    (2006.01)
(52) U.S. Cl.
CPC ........ *B23B 31/265* (2013.01); *B23B 2231/12* (2013.01); *B23B 2260/034* (2013.01);
(Continued)

(58) Field of Classification Search
CPC .......... B23B 2260/034; B23B 2231/12; B23B 2270/025; B23B 31/265; B23B 2260/146; Y10T 409/309464
See application file for complete search history.

(56) References Cited

U.S. PATENT DOCUMENTS 4,196,501 A    4/1980  Katsube et al.
4,915,553 A *  4/1990  Lazarevic ............. B23B 31/263
                                                          408/56
(Continued)

FOREIGN PATENT DOCUMENTS

EP    1468767 B1    12/2016

*Primary Examiner* — Eric A. Gates
*Assistant Examiner* — Reinaldo A Vargas Del Rio
(74) *Attorney, Agent, or Firm* — Corinne R. Gorski

(57) ABSTRACT

A clamping device for releasably holding a tool holder shank includes a spindle rotatably mounted inside a housing. A drawbar is axially moveable in a bore in the housing between an advanced releasing position and a retracted locking position. A plurality of engagement members are moveable under the effect of the drawbar into locking engagement with the tool holder shank. An actuating member is slidably mounted to the spindle. A motion transferring mechanism is arranged for transferring an axial movement of the actuating member into a movement of the drawbar. Two or more hydraulic actuators are arranged in or mounted on the housing on different sides of the spindle and configured to move the actuating member in relation to the spindle. A connecting element forms a connection in radial direction between the actuating member and piston members of the hydraulic actuators.

13 Claims, 7 Drawing Sheets

(52) U.S. Cl.
CPC ... *B23B 2260/146* (2013.01); *B23B 2270/025* (2013.01); *Y10T 409/309464* (2015.01)

(56) References Cited

U.S. PATENT DOCUMENTS

| | | |
|---|---|---|
| 6,079,918 A | 6/2000 | Buddendeck et al. |
| 2005/0002748 A1* | 1/2005 | Rehn .................. B23B 31/261 |
| | | 409/233 |

* cited by examiner

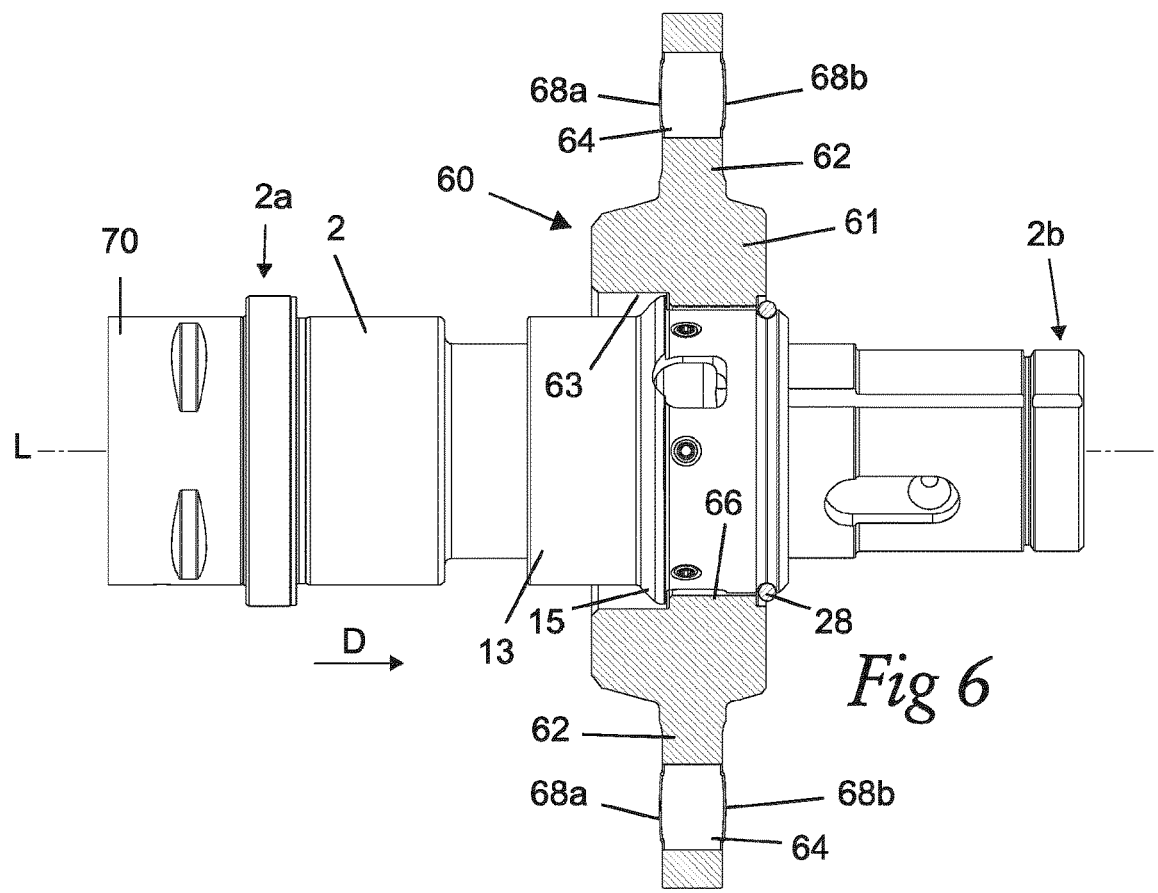
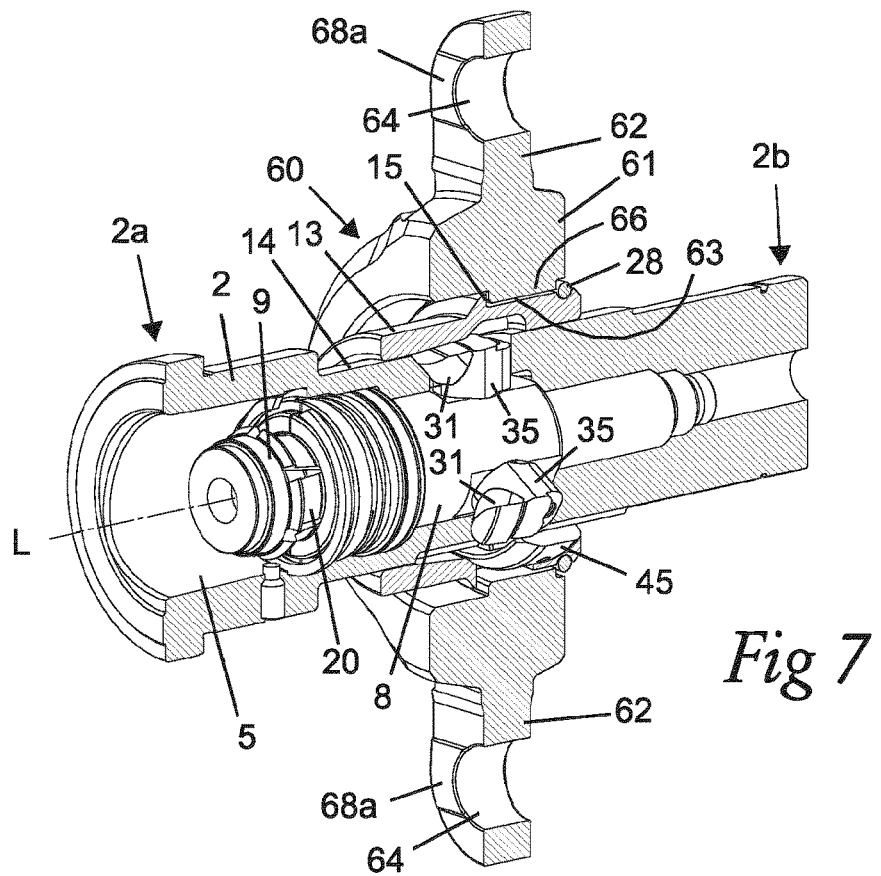

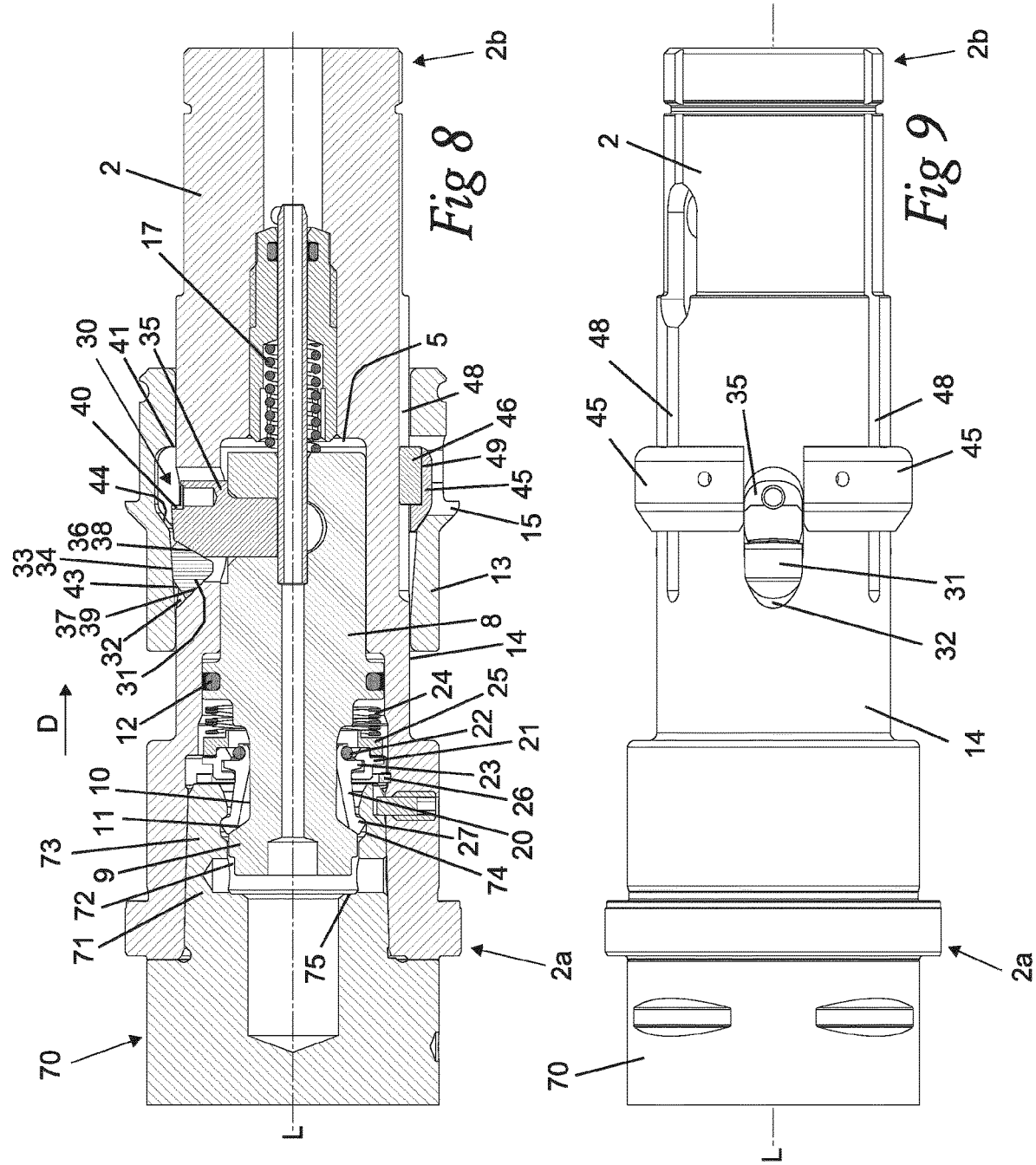

CLAMPING DEVICE FOR TOOL HOLDER

RELATED APPLICATION DATA

This application is a § 371 National Stage Application of PCT International Application No. PCT/EP2020/082173 filed Nov. 16, 2020 claiming priority to EP 19210465.1 filed Nov. 20, 2019.

FIELD OF THE INVENTION AND PRIOR ART

The present invention relates to a clamping device according to the preamble of claim 1, which is intended to be used for connecting a tool holder to a machine tool.

Within the field of machine tools for metal cutting, the cutting tools, for instance in the form of drills or milling tools, used for machining work pieces of metallic material are often fixed to and rotated together with a tool holder, which in its turn may be detachably clamped to a rotatable spindle of the machine tool in order to be rotated together with the spindle. It is previously know to clamp a shank of such a tool holder to a rotatable spindle by means of a clamping mechanism arranged in the spindle. When the cutting tool needs to be exchanged, the tool holder is released from the spindle and a new tool holder with another cutting tool is clamped to the spindle.

A clamping device comprising a spindle with a clamping mechanism adapted for an automatic tool changing operation is previously known from EP 1 468 767 B1. In the clamping device according to EP 1 468 767 B1, an actuating member in the form of a first drawbar is slidably mounted inside the spindle and configured to effect an axial displacement of a second drawbar via a force amplifying mechanism comprising a number of co-operating wedges arranged between the drawbars. A gas spring inside the spindle is configured to urge the two drawbars into a retracted locking position, in which a tool holder is clamped to the spindle, and a hydraulic piston may be configured to act on a piston at the rear end of the gas spring in order to achieve a displacement of the two drawbars into an advanced releasing position, in which the tool holder may be released from the spindle. However, this previously known clamping device has a relatively long axial extent and it is therefore not suitable to use this type of clamping device when tool holders are to be detachably fixed at the periphery of a tool turret where the available axial space for the clamping device is limited.

OBJECT OF THE INVENTION

The object of the present invention is to provide a clamping device of the above-mentioned type that has a new and favourable design and that is suitable for use with a tool turret of a machine tool.

SUMMARY OF THE INVENTION

According to the invention, said object is achieved by means of a clamping device having the features defined in claim 1.

The clamping device according to the invention comprises:
 a housing;
 a spindle rotatably mounted inside the housing and having a front end, a rear end and a bore which intersects the front end and extends rearwardly therefrom, wherein a mounting portion for receiving the tool holder shank is provided at a front end of the bore;
 a drawbar slidably mounted inside the bore so as to be reciprocally moveable in the bore along a longitudinal axis thereof between an advanced releasing position and a retracted locking position;
 engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep it secured to the spindle;
 an actuating member arranged inside the housing, wherein the actuating member is slidably mounted to the spindle so as to be moveable in relation to the spindle in the axial direction thereof;
 a motion transferring mechanism arranged inside the housing, wherein the motion transferring mechanism is mounted to the spindle and configured to transfer a movement of the actuating member in a first axial direction in relation to the spindle into a movement of the drawbar from the advanced releasing position to the retracted locking position;
 two or more hydraulic actuators arranged in or mounted on the housing on different sides of the spindle and configured to move the actuating member axially in relation to the spindle, wherein each hydraulic actuator comprises one or more piston members, each of which being slidably received in a space of the hydraulic actuator at the side of and at a distance from the spindle so as to be hydraulically moveable axially in this space in parallel with the longitudinal axis; and
 a connecting element at least partly arranged inside the housing and configured to form a connection in radial direction between the actuating member and the piston members of the hydraulic actuators, wherein the connecting element is configured to transfer an axial movement of the piston members in relation to the housing into a corresponding axial movement of the actuating member in relation to the spindle.

By controlling the axial movement of the drawbar by means of hydraulic actuators located at the side of the spindle on different sides thereof, no gas spring or the similar that takes up a lot of space in the axial direction is required for controlling the axial movement of the drawbar, which implies that the clamping device can be made compact in axial direction. The clamping device is therefore suitable for use in tool turrets. Furthermore, the use of hydraulic actuators for moving the actuating member, and thereby achieving a movement of the drawbar, implies that the clamping device according to the invention is suitable for use in automatic tool changing operations.

The clamping device according to the present invention may be mounted to a tool turret of a machine tool, wherein the rotatable spindle of the clamping device is connected or connectable to a drive mechanism in the tool turret. However, the clamping device is not limited to use in a tool turret. On the contrary, the rotatable spindle of the clamping device could constitute the main spindle of a machine tool or be connected to such a main spindle without any intermediate tool turret.

According to an embodiment of the invention, the actuating member is configured to assume a self-locking axial position in or on the spindle when the drawbar has been forced into the retracted locking position under the effect of the actuating member and the motion transferring mechanism, so as to thereby keep the drawbar in the retracted locking position. Hereby, the actuating member is capable of keeping the drawbar in the retracted locking position during rotation of the spindle without requiring any external force from the hydraulic actuators, which implies that the actuating member only needs to be subjected to forces from the hydraulic actuators in connection with a tool changing operation when the spindle and the actuating member are in a stationary position. Hereby, frictional forces between the actuating member and the connecting element and/or between the connecting element and the piston members of the hydraulic actuators during rotation of the spindle may be avoided or at least reduced to a very low level.

According to another embodiment of the invention, the connecting element comprises a central part, through which the connecting element is connected to the actuating member, and several arms, one for each hydraulic actuator, through which the connecting element is connected to the piston members of the hydraulic actuators, wherein each arm is fixed to the central part and projects from the central part in radial direction.

Another embodiment of the invention is characterized in:
that each hydraulic actuator comprises two such piston members, here denominated first and second piston members, which are arranged opposite each other and in alignment with each other;
that each one of said first and second piston members has a first side facing the other piston member and an opposite second side facing away from the other piston member, wherein a first hydraulic chamber is formed in said space of the hydraulic actuator on the second side of the first piston member and a second hydraulic chamber is formed in this space on the second side of the second piston member;
that each one of said arms of the connecting element has a part received in an interspace between the first and second piston members of the associated hydraulic actuator; and
that the connecting element is moveable in said first axial direction by feeding of hydraulic fluid into the first hydraulic chamber of each hydraulic actuator and in an opposite second axial direction by feeding of hydraulic fluid into the second hydraulic chamber of each hydraulic actuator.

With this arrangement of the piston members and the connecting element, it will be possible to transfer the required forces from the piston members to the actuating member in a simple and reliable manner.

According to another embodiment of the invention, the first and second piston members of each hydraulic actuator are fixedly connected to each other in order to be axially moveable together with each other. The stability of the hydraulic actuators is hereby improved.

According to another embodiment of the invention, the first and second piston members of each hydraulic actuator are connected to each other via a shaft, which extends across the interspace between the first and second piston members and through a recess in the part of the arm received in this interspace. In this case, the shafts between the piston members of the hydraulic actuators may be used a suspension points for the connecting element.

According to another embodiment of the invention, each such shaft is received with play in the recess of the associated arm, wherein one or more elastic elements, preferably in the form of O-rings, are arranged around the shaft and fitted between the shaft and the arm inside the recess in order to provide an elastic connection between the connecting element and the shaft. The arms of the connecting element may be subjected to bending moments during a movement of the actuating member. Said elastic elements will be capable of taking up small bending movements of the arms of the connecting element and may thereby prevent the piston members from being negatively affected by bending moments transferred from the arms of the connecting element.

According to another embodiment of the invention, each arm is configured to make contact with contact surfaces on the opposed first sides of the first and second piston members of the associated hydraulic actuator via contact surfaces on opposite sides of the part of the arm received in the interspace between these piston members, wherein said contact surfaces on the arm or said contact surfaces on the first and second piston members are convexly curved in order to provide linear contact between the arm and the piston members. This arrangement of the contact surfaces will give the arms of the connecting element a certain freedom to pivot in relation to the piston members, which may protect the piston members from being negatively affected by bending moments transferred from the arms of the connecting element.

According to another embodiment of the invention, the actuating member has the form of a sleeve, wherein the actuating member is arranged around a peripheral wall of the spindle and slidably mounted to this peripheral wall so as to be axially moveable in relation to the spindle, and wherein the actuating member is rotatable in relation to the connecting element together with the spindle. In this case, the actuating member may extend through a recess with circular cross-sectional shape in the central part of the connecting element.

Another embodiment of the invention is characterized in:
that the motion transferring mechanism comprises two or more wedges spaced apart in the circumferential direction of the spindle, each wedge being received in a respective aperture that extends radially through said peripheral wall of the spindle, wherein the wedges are configured to press the drawbar towards the retracted locking position when they are pressed radially inwards in the associated apertures;
that each wedge comprises a first pressure receiving surface which faces outwards from the spindle;
that the actuating member on its inner side is provided with a first pressure applying surface which faces inwards for contacting the first pressure receiving surface on each wedge, the first pressure applying surface having a radial distance to the longitudinal axis that increases as seen in said first axial direction; and
that the first pressure applying surface is configured to press each wedge radially inwards in the associated aperture by pressing against the first pressure receiving surface on each wedge when the actuating member is moved in said first axial direction.

Since the first pressure applying surface has a radial distance to the longitudinal axis that increases in the first axial direction, a movement of the actuating member in the first axial direction will cause a pressure to be applied by the first pressure applying surface on the first pressure receiving surface of each wedge. This pressure will have a component in the radial direction such that each wedge is pressed radially inwards towards the longitudinal axis.

According to another embodiment of the invention, the first pressure applying surface and the first pressure receiving surfaces are inclined in relation to the longitudinal axis by such an angle α that the wedges will keep the actuating member in a self-locking axial position on the spindle when the drawbar has been forced into the retracted locking position under the effect of the actuating member and the wedges. In this case, the first pressure applying surface and the first pressure receiving surface both extend in the same direction when viewed in a longitudinal section through the spindle. The angle α is chosen so as to be below a self-lock threshold angle, such that the actuating member attains a self-locking axial position in relation to the wedges when the drawbar has been displaced inside the bore into the retracted locking position. To obtain a self-locking axial position, the angle α should be sufficiently small, i.e. below the self-lock threshold angle. A self-locking axial position refers to an axial position in which the static frictional force between the first pressure receiving surface of each wedge and the first pressure applying surface of the actuating member is greater than the opposing force in the plane of friction that is caused by a force applied to the wedges in a radial direction perpendicular to the longitudinal axis. Hence, a self-locking axial position is obtained within an angular range that depends on the coefficient of friction between the first pressure receiving surface of each wedge and the first pressure applying surface of the actuating member. This coefficient of friction depends on various parameters, such as the materials used, coatings on the surfaces, use of lubricants, etc. Hence, the self-lock threshold angle is dependent on such parameters. A person skilled in the art will be able to identify the self-lock threshold angle that apply in each specific case by using common general knowledge and/or routine experiments, or at least predict or assess whether a certain angle is below such a self-lock threshold angle. In general, it is preferred to choose an angle α that is well below the self-lock threshold angle, to thereby ensure a self-locking configuration. A further benefit of using a small angle α is that a force-amplifying effect is achieved, owing to the fact that a small angle α implies that a relatively long axial displacement of the actuating member will result in a relatively short axial displacement of the drawbar. However, a too small angle α may be inefficient and not practically well-functioning. For example, a very small angle α may render it difficult to release the actuating member from the self-locking axial position. The angle α is with advantage between 2° and 10°. With an angle α within this range, a self-locking effect as well as an appropriate force-amplifying effect may be achieved.

According to another embodiment of the invention, the drawbar is, under the effect of the actuating member and the motion transferring mechanism, moveable from the advanced releasing position to the retracted locking position against the action of a spring force from a release spring arranged inside the spindle. Thus, the release spring is configured to move the drawbar towards the advanced releasing position when the actuating member is moved in a second axial direction opposite to the first axial direction. The release spring may ensure that the drawbar is pushed towards advanced releasing position immediately when the actuating member is moved in said second axial direction. The release spring may also ensure that the different components of the motion transferring mechanism are always maintained under a certain axial pressure and thereby are kept in close contact with each other and in proper positions in relation to each other and in relation to the actuating member and the drawbar.

Further advantageous features of the clamping device according to the present invention will appear from the description following below and the dependent claims.

BRIEF DESCRIPTION OF THE DRAWINGS

With reference to the appended drawings, a specific description of embodiments of the invention cited as examples follows below. In the drawings:

FIG. 6 is a partly cut lateral view of a parts included in the clamping device of FIG. 1, with a tool holder clamped to the spindle of the clamping device, FIG. 7 is a partly cut perspective view of the parts of the clamping device shown in FIG. 6, FIG. 8 is a longitudinal section through the tool holder and some of the parts of the clamping device shown in FIG. 6, with the tool holder clamped to the spindle, FIG. 9 is a planar view from above of the tool holder and the parts of the clamping device shown in FIG. 8, but with the actuating member removed from the spindle.

DETAILED DESCRIPTION OF EMBODIMENTS OF THE INVENTION

Figure 1:
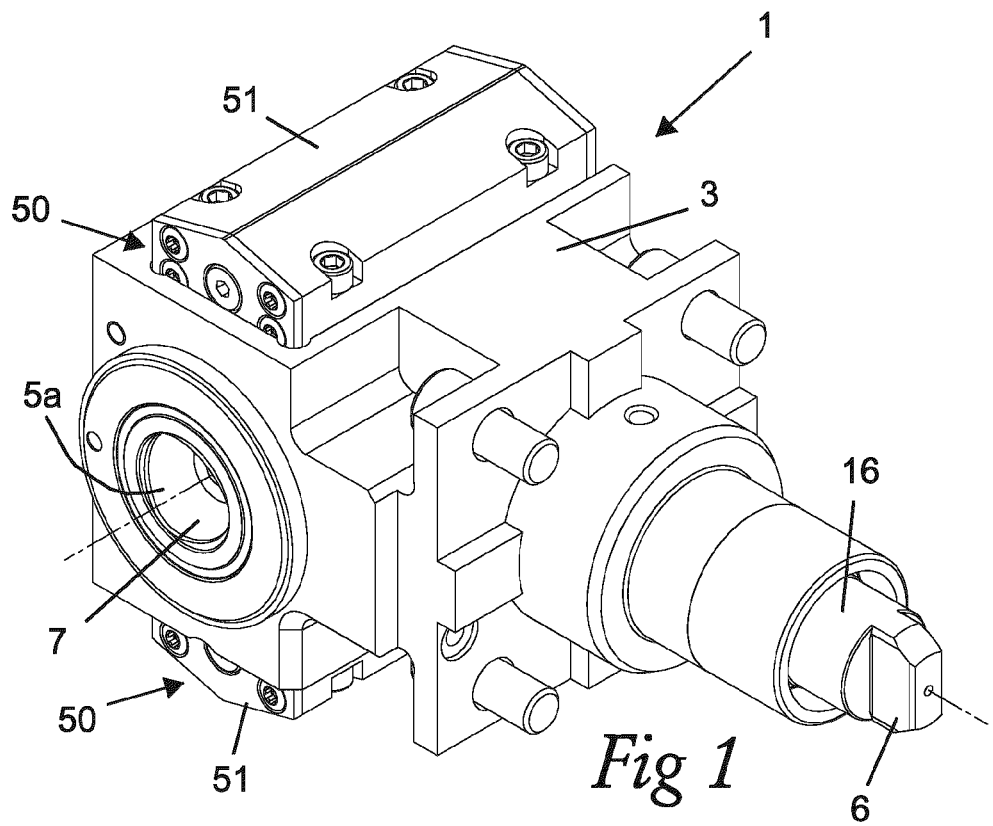
FIG. 1 is a perspective view of a clamping device according to an embodiment of the present invention.
Figure 2:
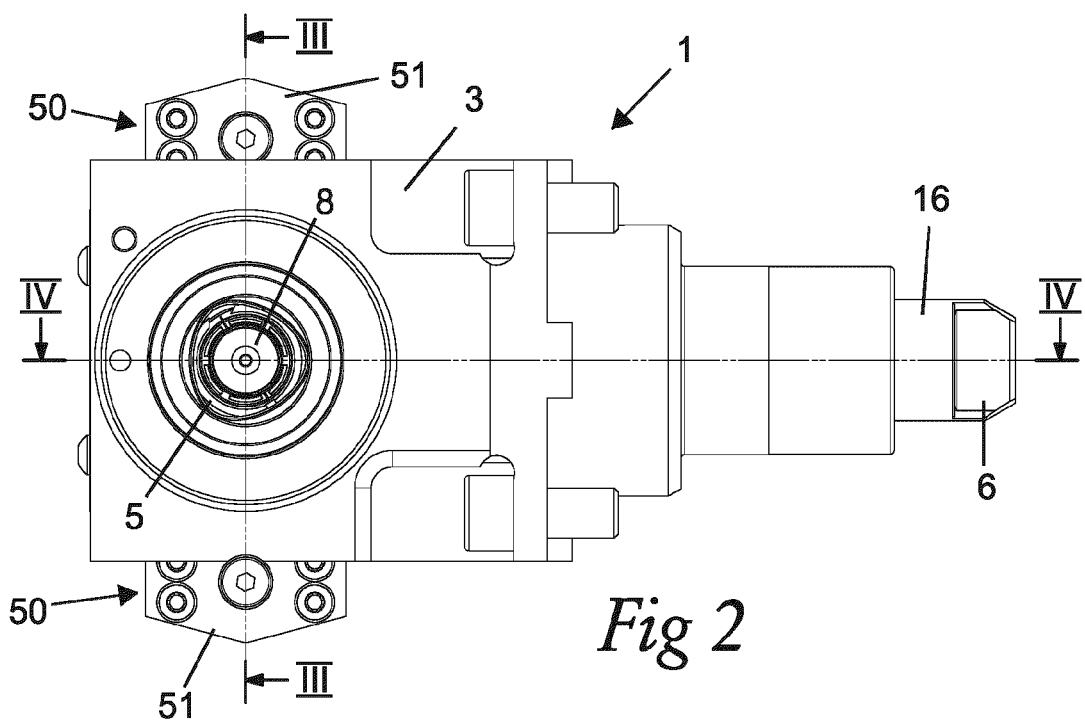
FIG. 2 is a front view of the clamping device of FIG. 1.

A clamping device 1 according to an embodiment of the present invention is illustrated in FIGS. 1-5. The clamping device 1 is configured to releasably clamp a tool holder 70 (very schematically illustrated in FIGS. 6 and 8-12) to a rotatable spindle 2 in the clamping device and enable the machining of a work piece by means of a cutting tool (not shown) fixed to the tool holder 70.

The spindle 2 is rotatably mounted to a housing 3 of the clamping device 1 by means of rolling bearings 4a, 4b, for instance in the form of a tapered roller bearing 4a and a ball bearing 4b or any other suitable type of rolling bearings. The spindle 2 has a front end 2a, a rear end 2b and a bore 5 which intersects the front end 2a and extends rearwardly therefrom. Thus, the bore 5 has an entrance opening 5a (see FIGS. 1 and 10) at the front end 2a of the spindle.

In the embodiment illustrated in FIGS. 1-5, the clamping device 1 comprises a drive shaft 16, which is rotatably mounted to the housing 3 by means of rolling bearings 18a, 18b, for instance in the form of a ball bearing 18a and a roller bearing 18b or any other suitable type of rolling bearings. The drive shaft 16 has a first end 16a facing the spindle 2 and an opposite second end 16b facing away from the spindle. The drive shaft 16 is connectable to a drive mechanism of a machine tool, for instance a drive mechanism in a tool turret of a machine tool, via a connection pin 6 at the second end 16b of the drive shaft in order to allow the drive shaft 16 to be driven in rotation by the drive mechanism. The drive shaft 16 is drivingly connected to the spindle 2 via a bevel gear arrangement 19 consisting of a first bevel gear 19a, which is non-rotatably fixed to the drive shaft 16 at the first end 16a thereof, and a second bevel gear 19b, which is in engagement with the first bevel gear 19a and non-rotatably fixed to the spindle 2.

A mounting portion 7 (see FIGS. 1 and 10) for receiving a mounting shank 71 on the tool holder 70 is provided at a front end of the bore 5. This mounting shank 71 is here referred to as tool holder shank.

Figure 3:
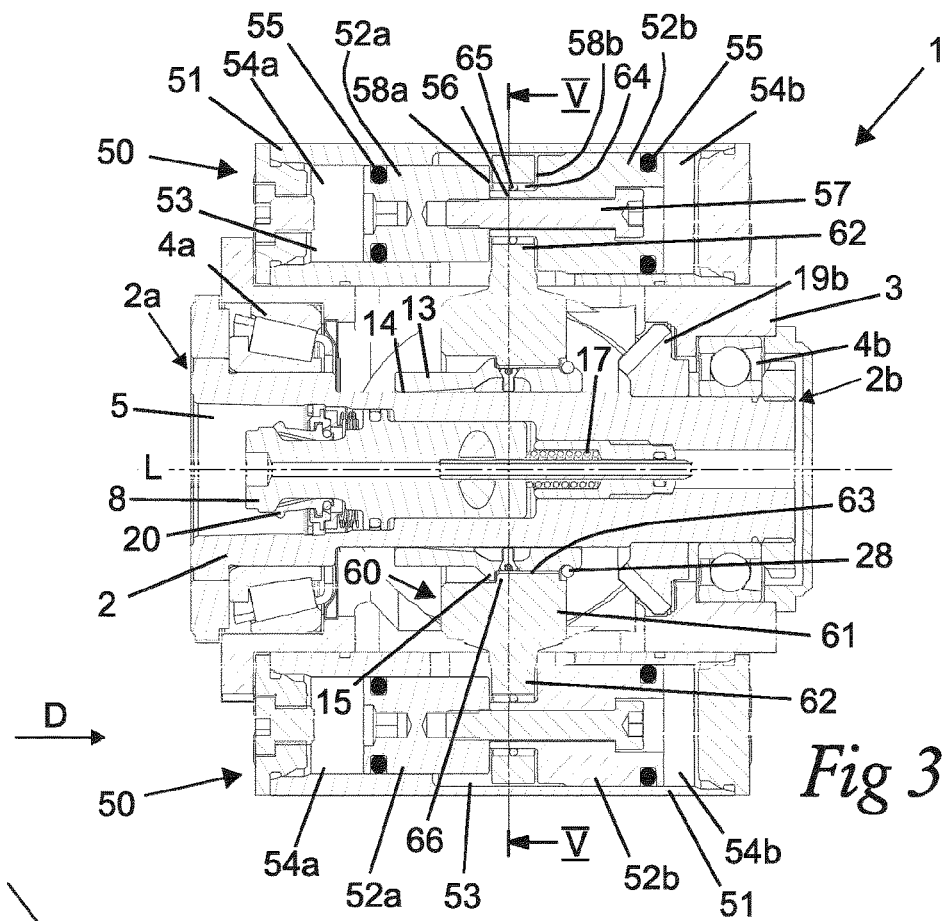
FIG. 3 is a cut according to the line III-III in FIG. 2.
Figure 4:
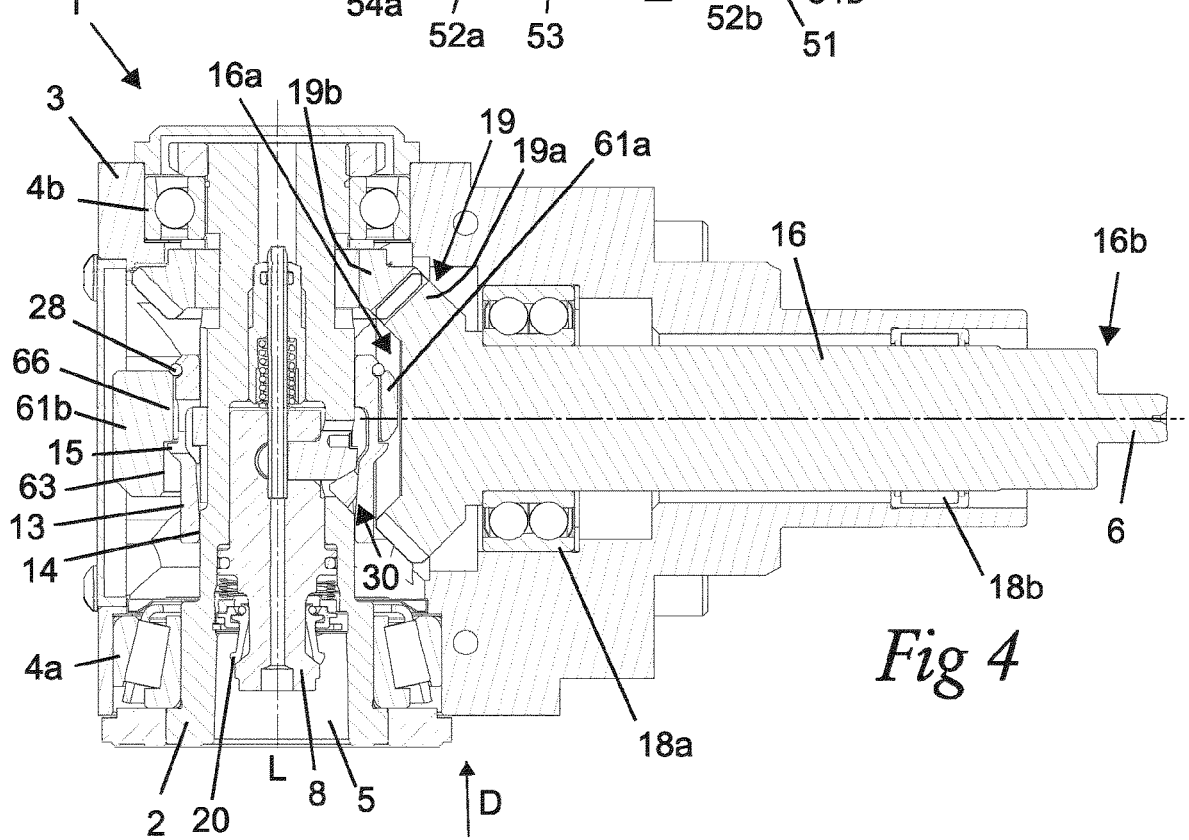
FIG. 4 is a cut according to the line IV-IV in FIG. 2.

A drawbar 8 is slidably mounted inside the bore 5 so as to be reciprocally moveable in the bore 5 along a longitudinal axis L thereof between an advanced releasing position (see FIG. 12) and a retracted locking position (see FIGS. 3, 4 and 8). The drawbar 8 has a front end facing the entrance opening 5a of the bore 5 and an opposite rear end. A head portion 9 and a neck portion 10 are provided at the front end of the drawbar 8. The head portion 9 is located in front of the neck portion 10 as seen in the longitudinal direction of the drawbar, wherein the head portion 9 is connected to the neck portion 10 via a rearwardly facing bevelled surface 11 on the head portion 9. A sealing ring 12 is arranged between the drawbar 8 and an inner surface of the bore 5. In the illustrated example, this sealing ring 12 is received in a groove on the outer side of the drawbar 8.

The tool holder shank 71 is insertable into the mounting portion 7 of the bore 5 via the entrance opening 5a at the front end 2a of the spindle 2. The head portion 9 of the drawbar is received in an engagement bore 72 in the tool holder shank 71 and a tubular wall 73 of the tool holder shank is received in a space between the head portion 9 and an inner surface of the bore 5. In the illustrated embodiments, the mounting portion 7 of the bore 5 is conically shaped and has a somewhat "triangular" or polygonal, non-circular cross-sectional shape adapted to receive a similarly shaped tool holder shank 71. The conical shape ensures a connection free from play in the radial as well as the axial direction between the tool holder shank 71 and the spindle 2, whereas the non-circular cross-section ensures a non-rotatable fixation of the tool holder shank 71 to the spindle 2. However, the mounting portion of the bore 5 could also have any other suitable shape for receiving other types of tool holder shanks.

Engagement members 20 in the form of segments are arranged around the drawbar 8 at a front end thereof. Under the effect of a movement of the drawbar 8 from the advanced releasing position to the retracted locking position, the engagement members 20 are moveable from a first position (see FIG. 12), in which the engagement members 20 allow the tool holder shank 71 to move into and out of the mounting portion of the bore 5, to a second position (see FIG. 8), in which the engagement members 20 are in locking engagement with an engagement groove 74 in the engagement bore 72 in the tool holder shank 71 and thereby keep the tool holder shank 71 secured to the spindle 2.

In the illustrated embodiments, the engagement members 20 are arranged around the neck portion 10 of the drawbar 8 and held in place around the neck portion by means of a retainer ring 21 (see FIG. 8) and an elastic O-ring 22, which are arranged in the bore 5 and surround the neck portion 10. Each engagement member 20 has an outwardly facing flange portion 23 engaged in an inner groove in the retainer ring 21. The O-ring 22 is received in an outwardly facing groove at the rear end of each engagement member 20. A compression spring 24, a thrust ring 25 and a stop ring 26 are also arranged in the bore 5 and configured to surround the drawbar 8. The compression spring 24 is mounted between a shoulder on the drawbar 8 and the thrust ring 25 and it is configured to urge the thrust ring 25, the retainer ring 21 and the engagement members 20 forwards. The forward movement of the retainer ring 21 towards the entrance opening of the bore 5 is limited by the stop ring 26, which is mounted in a groove in an inner surface of the bore 5.

Figure 12:
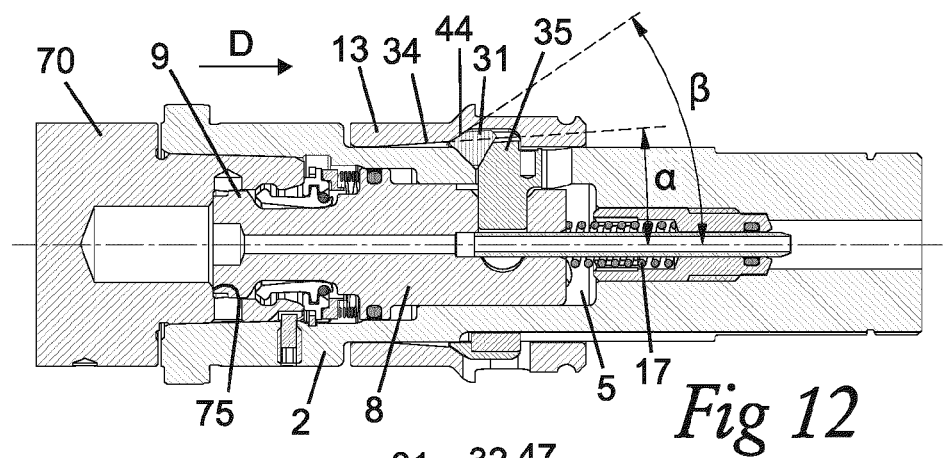
FIG. 12 is a longitudinal section through the tool holder and the parts of the clamping device shown in FIG. 8, with the tool holder in an unclamped state.

At its front end, each engagement member 20 is provided with an outwardly directed engagement flange 27, which is configured to be in engagement with the engagement groove 74 in the tool holder shank 71 when the engagement member 20 is in the above-mentioned second position. When the drawbar 8 is in the advanced releasing position, the front ends of the engagement members 20 are located behind the head portion 9 of the drawbar 8 and the engagement flanges 27 are out of engagement with the engagement groove 74 in the tool holder shank 71, as illustrated in FIG. 12. When the drawbar 8 is moved axially rearwards in the bore 5 along the longitudinal axis L thereof, the bevelled surface 11 on the head portion 9 of the drawbar will come into contact with the front ends of the engagement members 20, wherein the front ends of the engagement members 20 will slide on this bevelled surface 11 and be pressed outwards so that the engagement flanges 27 on the engagement members come into engagement with the engagement groove 74 in the tool holder shank 71, whereupon the tool holder shank 71 will be pulled by the drawbar 8 into firm contact with inner surfaces of the spindle 2 within the mounting portion of the bore 5.

The clamping device 1 further comprises an actuating member 13, which is concentric with the spindle 2 and slidably mounted to the spindle so as to be axially moveable in relation to the spindle 2 along the longitudinal axis L. The actuating member 13 is non-rotatably mounted to the spindle 2, i.e. prevented from rotating in relation to the spindle 2, and consequently configured to rotate together with the spindle 2. A motion transferring mechanism 30 is mounted to the spindle 2 and configured to transfer an axial movement of the actuating member 13 in a first axial direction D in relation to the spindle 2 into a movement of the drawbar 8 from the advanced releasing position to the retracted locking position. In the illustrated embodiments, this first axial direction D is a direction towards the rear end 2b of the spindle 2. Thus, in this case a movement of the drawbar 8 from the advanced releasing position to the retracted locking position is effected by an axial movement of the actuating member 13 rearwards along the spindle 2. However, as an alternative, the actuating member 13 and the motion transferring mechanism 30 could be arranged to co-operate in such a manner that a movement of the drawbar 8 from the advanced releasing position to the retracted locking position is effected by an axial movement of the actuating member 13 forwards along the spindle 2.

Figure 14:
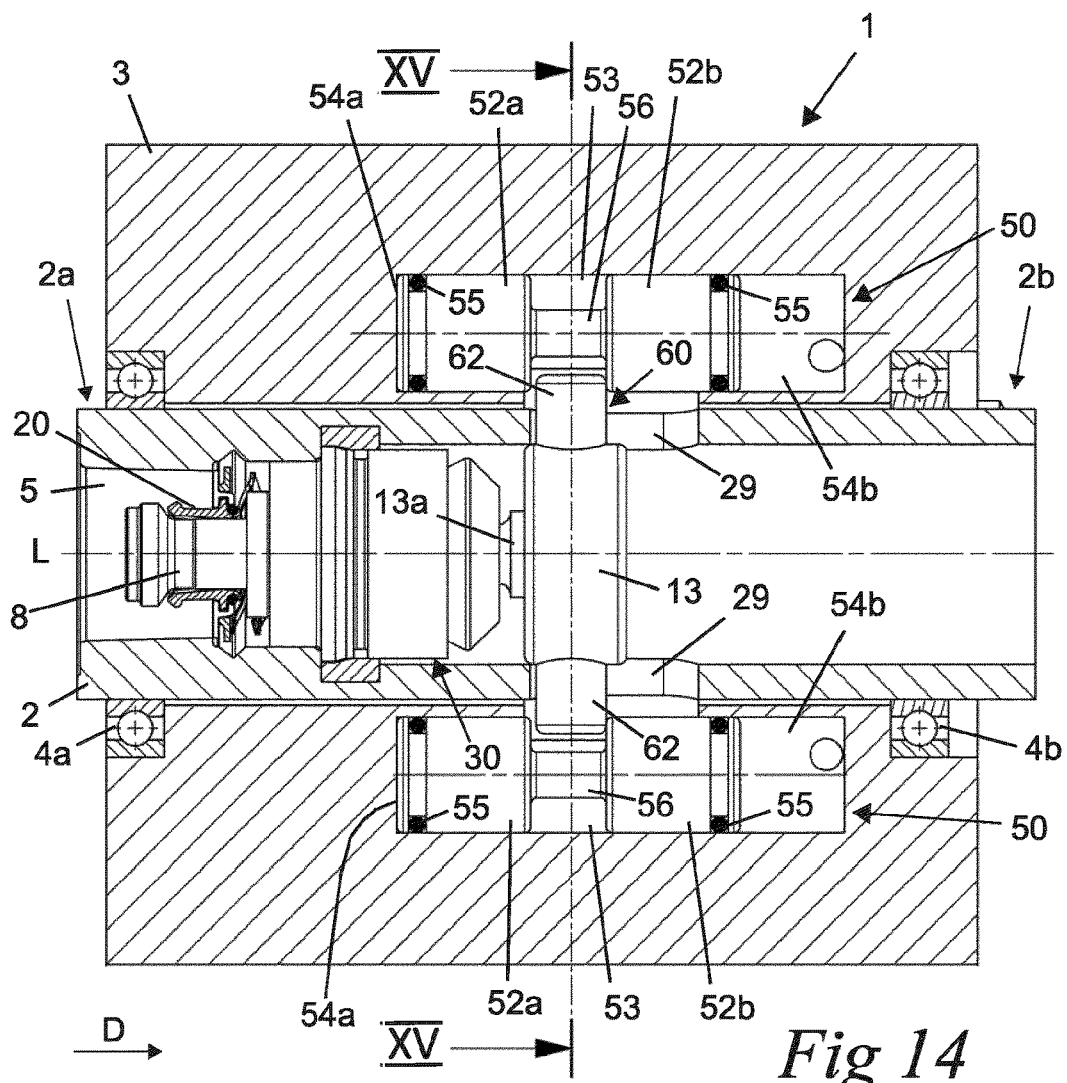
FIG. 14 is a schematic partly cut lateral view of a clamping device according to another embodiment of the invention.
Figure 15:
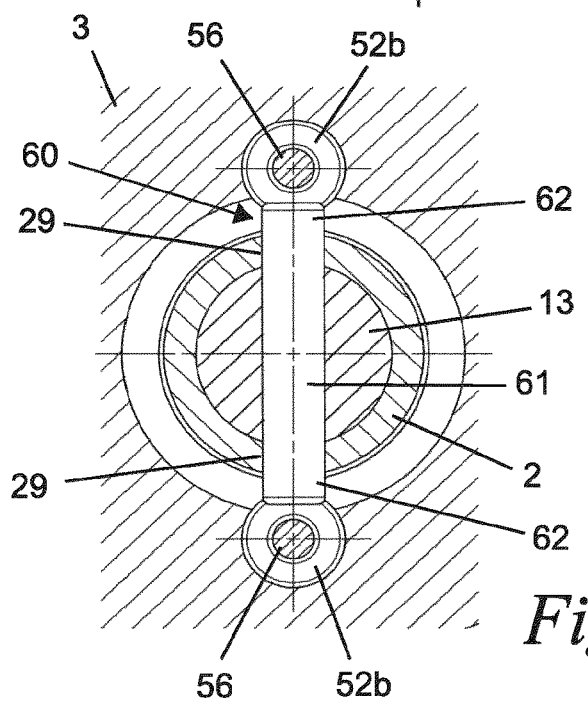
FIG. 15 is a cross-section according to the line XV-XV in FIG. 14.

Furthermore, the clamping device 1 comprises two or more hydraulic actuators 50, which are arranged in or mounted on the housing 3 on different sides of the spindle 2 and configured to move the actuating member 13 axially in relation to the spindle 2. In the embodiments illustrated in FIGS. 1-5 and in FIGS. 14 and 15, the hydraulic actuators 50 are two in number and arranged opposite each other on opposite sides of the spindle 2. However, it would also be possible to use more than two hydraulic actuators 50 distributed around the spindle 2 in any suitable manner. In the embodiment illustrated in FIGS. 1-5, each hydraulic actuator 50 comprises a separate actuator casing 51, which is fixed to the housing 3 on opposite sides thereof. However, the hydraulic actuators 50 may as an alternative be integrated in the housing 3, as illustrated in FIGS. 14 and 15.

Each hydraulic actuator 50 comprises one or more piston members 52*a*, 52*b*, each of which being slidably received in a space 53 of the hydraulic actuator 50 at the side of and at a distance from the spindle 2 so as to be hydraulically moveable axially in this space 53 in parallel with the longitudinal axis L. In the embodiment illustrated in FIGS. 1-5 and in the embodiment illustrated in FIGS. 14 and 15, each hydraulic actuator 50 comprises two such piston members 52*a*, 52*b*, here denominated first and second piston members, which are arranged opposite each other and in alignment with each other, wherein each piston member 52*a*, 52*b* has a first side facing the other piston member and an opposite second side facing away from the other piston member. A first hydraulic chamber 54*a* is formed in said space 53 on the second side of the first piston member 52*a* and a second hydraulic chamber 54*b* is formed in the space 53 on the second side of the second piston member 52*b*. As an alternative, each hydraulic actuator 50 could comprise only one piston member configured to divide the associated space of the hydraulic actuator into a first hydraulic chamber on a first side of the piston member and a second hydraulic chamber on an opposite second side of the piston member. As a further alternative, each hydraulic actuator 50 could comprise two hydraulic cylinders arranged opposite each other, including a first hydraulic cylinder for moving the actuating member in said first axial direction D and a second hydraulic cylinder for moving the actuating member in the opposite direction.

Each piston member 52*a*, 52*b* is provided with a sealing ring 55 mounted in a groove in an outwardly facing surface on the piston member so as to be in sealing contact with a respective wall that delimits the above-mentioned space 53 in radial direction outwards.

The clamping device 1 also comprises a connecting element 60, which is at least partly arranged inside the housing 3 and configured to form a connection in radial direction between the actuating member 13 and the piston members 52*a*, 52*b* of the hydraulic actuators 50. In the embodiment illustrated in FIGS. 1-5, the connecting element 60 extends from the housing 3 and into the actuator casings 51, and in the embodiment illustrated in FIGS. 14 and 15, the entire connecting element 60 is located inside the housing 3. The connecting element 60 is configured to transfer an axial movement of the piston members 52*a*, 52*b* in relation to the housing 3 into a corresponding axial movement of the actuating member 13 in relation to the spindle 2. In the illustrated embodiments, the first piston member 52*a* is moveable in the above-mentioned first axial direction D by feeding of hydraulic fluid into the first hydraulic chamber 54*a* in order to effect a movement of the connecting element 60 and the actuating member 13 is this first axial direction D and the second piston member 52*b* is moveable in a second axial direction, opposite to the first axial direction D, by feeding of hydraulic fluid into the second hydraulic chamber 54*b* in order to effect a movement of the connecting element 60 and the actuating member 13 is this second axial direction.

The actuating member 13 is preferably configured to assume a self-locking axial position on the spindle 2 when the drawbar 8 has been forced into the retracted locking position under the effect of the actuating member 13 and the motion transferring mechanism 30, so as to thereby allow the actuating member 13 to keep the drawbar 8 in the retracted locking position. Hereby, the piston members 52*a*, 52*b* of the hydraulic actuators 50 only need to exert a force on the connecting element 60 in connection with a tool changing operation when the spindle 2 is stationary and the drawbar 8 is to be moved from the retracted locking position to the advanced releasing position and then back to the retracted locking position. In the self-locking axial position, frictional forces between the actuating member 13 and parts of the motion transferring mechanism 30 and/or the spindle 2 that are in contact with the actuating member 13 prevent the actuating member from being axially displaced in a direction opposite to the first axial direction D.

In the illustrated embodiments, the connecting element 60 comprises a central part 61, through which the connecting element is connected to the actuating member 13, and several arms 62, one for each hydraulic actuator 50, through which the connecting element 60 is connected to the piston members 52*a*, 52*b* of the hydraulic actuators. Each arm 62 is fixed to the central part 61 and projects from the central part in radial direction. Each arm 62 has a part received in an interspace between the first and second piston members 52*a*, 52*b* of the associated hydraulic actuator 50. The connecting element 60 may of course be designed in many different manners, depending on the specific design of the clamping device 1.

The first and second piston members 52*a*, 52*b* of each hydraulic actuator 50 are with advantage fixedly connected to each other in order to be axially moveable together with each other. In the illustrated embodiments, the first and second piston members 52*a*, 52*b* of each hydraulic actuator 50 are connected to each other via a shaft 56, which extends across the interspace between the first and second piston members. In this case, the first and second piston members 52*a*, 52*b* of each hydraulic actuator 50 may be fixed to each other by means of a fastening element 57 (see FIG. 3), for instance in the form of a screw, which extends between the piston members 52*a*, 52*b* through a bore in the shaft 56. However, the first and second piston members 52*a*, 52*b* and the intermediate shaft 56 may as an alternative be formed in one piece.

In the embodiment illustrated in FIGS. 1-13, the actuating member 13 has the form of a sleeve. In this case, the actuating member 13 is arranged around a peripheral wall 14 of the spindle 2 and slidably mounted to this peripheral wall so as to be axially moveable in relation to the spindle. In this case, the actuating member 13 is rotatable in relation to the connecting element 60 together with the spindle 2. The sleeve-shaped actuating member 13 may for instance extend through a recess 63 with circular cross-sectional shape in the central part 61 of the connecting element 60.

Figure 5:
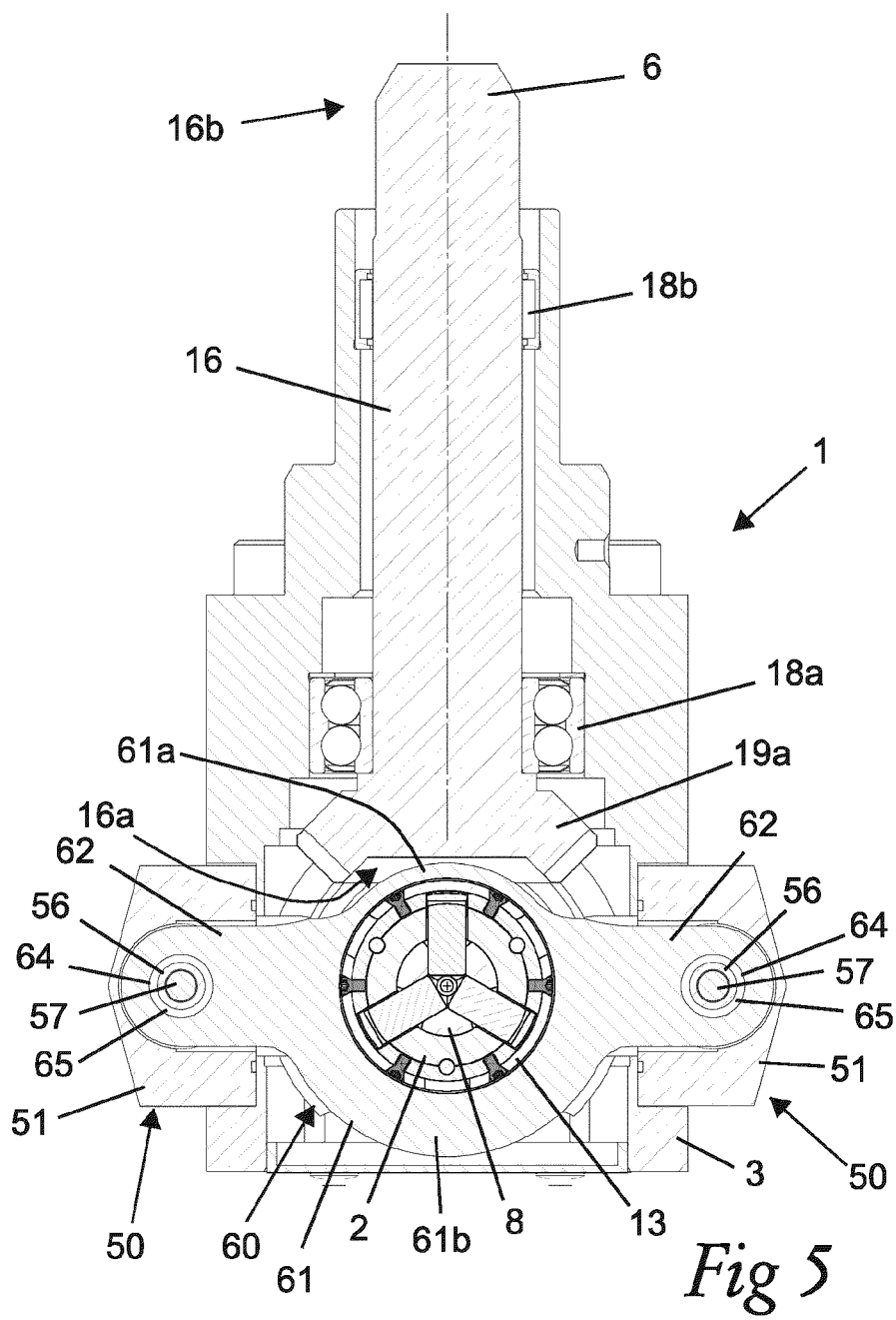
FIG. 5 is a cut according to the line V-V in FIG. 3.
Figure 10:
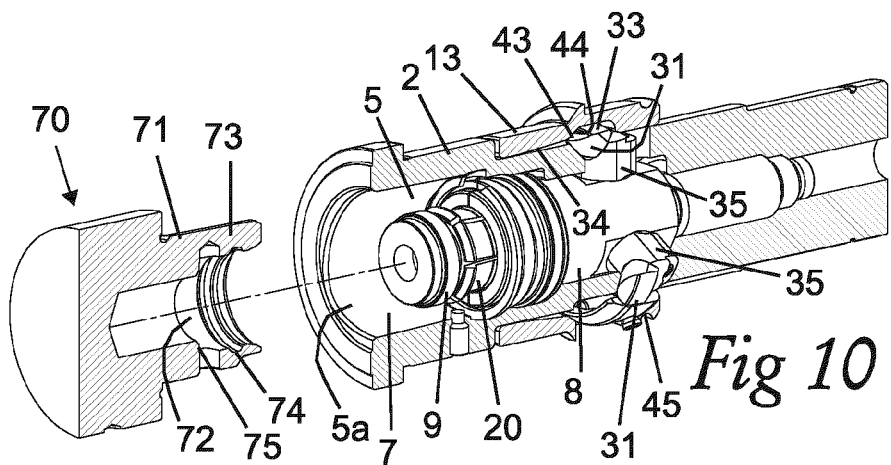
FIG. 10 is a partly cut perspective view of the tool holder and the parts of the clamping device shown in FIG. 8, with the tool holder detached from the spindle.
Figure 11:
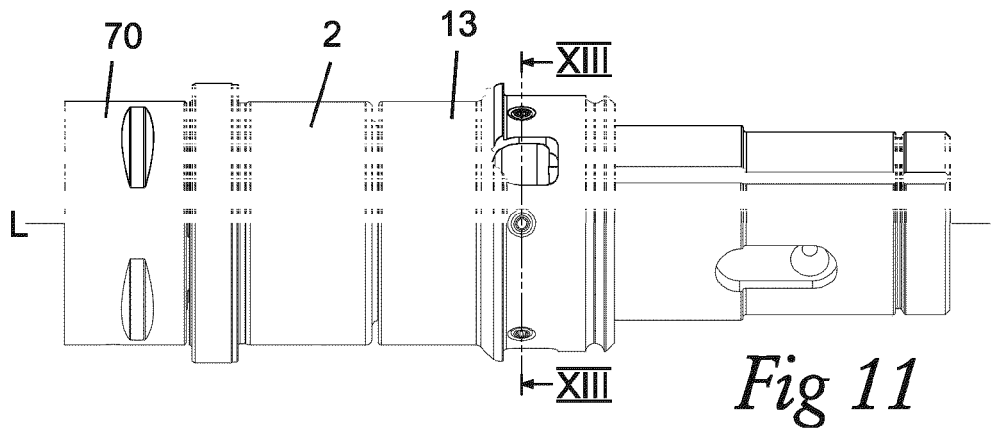
FIG. 11 is a lateral view of the tool holder and the parts of the clamping device shown in FIG. 8, with the tool holder in an unclamped state.

In the embodiment illustrated in FIGS. 3-5, the central part 61 of the connecting element 60 comprises a first section 61*a* which is received in a narrow gap between the sleeve-shaped actuating member 13 and the first end 16*a* of the drive shaft 16, wherein this first section 61*a* is rather thin in order to be able to extend through this narrow gap. The illustrated connecting element 60 also comprises a second section 61*b* located on the opposite side of the actuating member 13, wherein this second section 61*b* is thicker and larger than the first section 61*a* in order to give the connecting element 60 a sufficient strength.

In the embodiment illustrated in FIGS. 3-5, the shaft 56 arranged between the first and second piston members 52*a*, 52*b* of each hydraulic actuator 50 extends through a recess 64 in the part of the arm 62 of the connecting element that is received in the interspace between these piston members 52a, 52b. In this case, the connecting element 60 is suspended on the shafts 56 and prevented from rotating in relation to the housing 3 by these shafts 56. Each shaft 56 is with advantage received with play in the recess 64 of the associated arm 62, wherein one or more elastic elements 65, preferably in the form of O-rings, are arranged around the shaft 56 and fitted between the shaft 56 and the arm 62 inside the recess 64 in order to provide an elastic connection between the connecting element 60 and the shaft. The elastic elements 65 take up the play between each shaft 56 and the associated arm 62 and allow a certain flexibility between each shaft 56 and the associated arm 62.

Each arm 62 is configured to make contact with contact surfaces 58a, 58b (see FIG. 3) on the opposed first sides of the first and second piston members 52a, 52b of the associated hydraulic actuator 50 via contact surfaces 68a, 68b (see FIGS. 6 and 7) on opposite sides of the part of the arm 62 received in the interspace between these piston members 52a, 52b. Said contact surfaces 68a, 68b on the arm or said contact surfaces 58a, 58b on the first and second piston members are with advantage convexly curved in order to provide linear contact between the arm 62 and the piston members 52a, 52b, to thereby allow each arm 62 to be slightly inclined in relation to the associated piston members 52a, 52b when the arms 62 are subjected to bending moments in connection with an axial movement of the piston members 52a, 52b. In the illustrated embodiment, it is the contact surfaces 68a, 68b on the arms that are convexly curved, whereas the associated contact surfaces 58a, 58b on the piston members 52a, 52b are flat. However, as an alternative, the contact surfaces 68a, 68b on the arms may be flat and the associated contact surfaces 58a, 58b on the piston members 52a, 52b convexly curved.

In the embodiment illustrated in FIGS. 3-5, an annular internal protuberance 66 is provided in the recess 63 in the central part of the connecting element 60. Furthermore, an annular external protuberance 15 is provided on the outer side of the actuating member 13 and a lock ring 28 is fixed to the actuating member 13 on the outer side thereof, wherein the lock ring 28 and the external protuberance 15 are spaced apart in the axial direction of the actuating sleeve 13. The internal protuberance 66 on the connecting element 60 is received with play in a gap formed between the external protuberance 15 and the lock ring 28. In this case, axial force is transferred from the connecting element 60 to the actuating sleeve 13 via the lock ring 28 when the hydraulic actuators 50 move the actuating sleeve 13 in the first axial direction D and via the external protuberance 15 when the hydraulic actuators move the actuating sleeve in the opposite direction.

It is important to avoid frictional forces between the sleeve-shaped actuating member 13 and the connecting element 60 during the machining operations or at least keep such frictional forces as low as possible, due to the fact that the actuating member 13 rotates together with the spindle 2 at high speed during machining operations, whereas the connecting element 60 remains stationary during machining operations. In the embodiment illustrated in FIGS. 3-5, frictional forces at the interface between the connecting element 60 and the actuating member 13 are avoided by having a small play in radial and axial direction between the actuating member and the connecting element. As an alternative, such frictional forces may be avoided by having the connecting element 60 connected to the actuating member 13 via a rolling bearing, preferably in the form of a ball bearing, arranged between the outer side of the actuating member 13 and the inner side of the recess 63 in the central part 61 of the connecting element 60.

In the embodiment illustrated in FIGS. 1-13, a release spring 17, preferably in the form of a helical compression spring, is mounted in a space inside the spindle 2 and configured to act on the rear end of the drawbar 8 in order to urge the drawbar towards the advanced releasing position. The drawbar 8 is moveable, under the effect of the actuating member 13 and the motion transferring mechanism 30, from the advanced releasing position to the retracted locking position against the action of a spring force from this release spring 17. The release spring 17 is with advantage arranged along the longitudinal axis L, behind the drawbar 8.

The motion transferring mechanism 30 may be designed in many different manners. In the embodiment illustrated in FIGS. 1-13, the motion transferring mechanism comprises three wedges 31, which are spaced apart in the circumferential direction of the spindle 2. Each wedge 31 is received in a respective aperture 32 that extends radially through the above-mentioned peripheral wall 14 of the spindle 2, wherein the wedges 31 are configured to press the drawbar 8 towards the retracted locking position when they are pressed radially inwards in the associated apertures 32. Each wedge 31 comprises a first pressure receiving surface 33 (see FIGS. 8 and 10) which faces outwards from the spindle 2, and the actuating member 13 is on its inner side provided with a first pressure applying surface 34 which faces inwards for contacting the first pressure receiving surface 33 on each wedge. The first pressure applying surface 34 has a radial distance to the longitudinal axis L that increases as seen in the above-mentioned first axial direction D. The first pressure applying surface 34 is configured to press the wedges 31 radially inwards in the apertures 32 by pressing against the first pressure receiving surface 33 on each wedge when the actuating member 13 is moved in the first axial direction D.

The illustrated motion transferring mechanism 30 also comprises three wedge engagement members 35, which project radially from the drawbar 8 into a respective one of the apertures 32 and which are fixed to the drawbar so as to be moveable along the longitudinal axis L together with the drawbar. Thus, a movement of a wedge engagement member 35 along the longitudinal axis L will cause a corresponding movement of the drawbar 8. Each wedge engagement member 35 is in contact with one of the wedges 31. In order to facilitate the assembly of the clamping device 1, the illustrated wedge engagement members 35 are formed as separate elements mounted in a respective radial recess in the drawbar 8. However, the wedge engagement members 35 may as an alternative be mounted to the drawbar 8 in any other suitable manner or formed in one piece with the drawbar.

The motion transferring mechanism 30 may comprise any suitable number of wedges 31 and associated wedge engagement members 35 arranged to extend through a corresponding number of apertures 32 in the peripheral wall 14 of the spindle 2. The apertures 32 and the associated wedges 31 and wedge engagement members 35 are preferably evenly distributed in the circumferential direction of the peripheral wall 14.

Each wedge engagement member 35 has a slide surface 36 which faces towards the front end 2a of the spindle 2, and each aperture 32 has a slide surface 37 which faces towards the rear end 2b of the spindle. Furthermore, each wedge 31 has a first wedge surface 38 which faces towards the rear end 2b of the spindle and a second wedge surface 39 which faces towards the front end 2a of the spindle, wherein these first and second wedge surfaces 38, 39 approach each other in a radial direction towards the longitudinal axis L. The first wedge surface 38 of each wedge 31 is in contact with the slide surface 36 of the associated wedge engagement member 35 and the second wedge surface 39 of each wedge is in contact with the slide surface 37 of the associated aperture 32. When the wedges 31 are pressed radially inwards in the apertures 32 by the actuating member 13, the first and second wedge surfaces 38, 39 of each wedge 31 will slide and press against the corresponding slide surfaces 36, 37 of the associated wedge engagement member 35 and aperture 32 and thereby force the drawbar 8 to move towards the retracted locking position.

The first pressure applying surface 34 and the first pressure receiving surfaces 33 are preferably inclined in relation to the longitudinal axis L by such an angle α (see FIG. 12) that the wedges 31 will keep the actuating member 13 in a self-locking axial position on the spindle 2 when the drawbar 8 has been forced into the retracted locking position under the effect of the actuating member 13 and the wedges 31.

Each wedge 31 may also comprise a second pressure receiving surface 43 which faces outwards from the spindle 2, wherein the actuating member 13 on its inner side is provided with a second pressure applying surface 44 which faces inwards for contacting the second pressure receiving surface 43 on each wedge. The second pressure applying surface 44 has a radial distance to the longitudinal axis L that increases as seen in the first axial direction D. The second pressure applying surface 44 and the second pressure receiving surfaces 43 are inclined in relation to the longitudinal axis L by an angle β (see FIG. 12) which is larger than the above-mentioned angle α. The first and second pressure applying surfaces 34, 44 and the first and second pressure receiving surfaces 33, 43 are arranged consecutively on the actuating member 13 and on each wedge 31, respectively, such that, upon a movement of the actuating member 13 in the first axial direction D, the second pressure applying surface 44 is configured to slide and press against the second pressure receiving surface 43 on each wedge during an initial first phase of the movement, whereupon the first pressure applying surface 34 is configured to slide and press against the first pressure receiving surface 33 on each wedge during a subsequent second phase of the movement.

Each wedge engagement member 35 further comprises a release pressure receiving surface 40 which faces towards the rear end 2b of the spindle 2, and the actuating member 13 comprises a release pressure applying surface 41 which faces towards the front end 2a of the spindle. The release pressure applying surface 41 of the actuating member 13 is configured to come into contact with the release pressure receiving surfaces 40 of the wedge engagement members 35 when the actuating member 13 is moved in the above-mentioned second axial direction, to thereby allow the actuating member to exert a forwardly directed axial force on the drawbar 8 via the wedge engagement members 35 during a final phase of the movement of the drawbar from the retracted locking position to the advanced releasing position.

Figure 13:
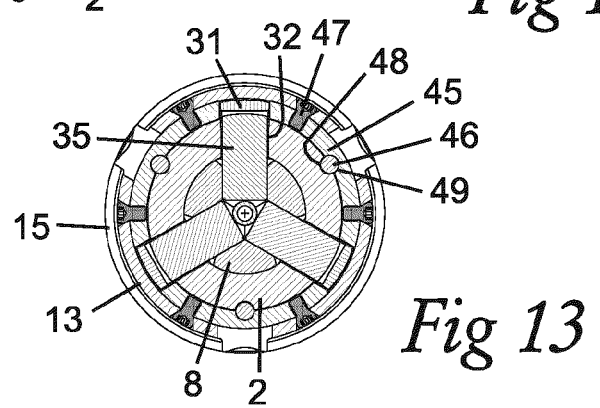
FIG. 13 is a cross-section according to the line XIII-XIII in FIG. 11.

In the embodiment illustrated in FIGS. 1-13, supporting segments 45 and pins 46 are arranged between the actuating member 13 and the spindle 2. The supporting segments 45 are arranged on the inner side of the actuating member 13 and are fixed to the actuating member by means of screws 47, as illustrated in FIG. 13. The supporting segments 45 support the wedges 31 such that they are kept in place and are prevented from being dislocated with respect to the actuating member 13 in the circumferential direction. Each pin 46 is accommodated partly in a longitudinal groove 48 in the spindle 2 and partly in a recess 49 in a supporting segment 45. The pins 46 are slidably received in the longitudinal grooves 48 on the outer side of the spindle 2 and thereby allowed to move axially together with the actuating member 13 when the actuating member is axially moved in relation to the spindle. The pins 46 prevent mutual rotation between the actuating member 13 and the spindle 2. Consequently, when the spindle 2 is rotated, the actuating member 13 will rotate together with the spindle 2 with the same rotational speed and cannot be displaced in relation to the spindle 2 in the circumferential direction.

When a tool holder 70 is to be clamped to the spindle 2, the tool holder shank 71 is inserted into the mounting portion 7 of the bore 5 with the spindle 2 kept in a stationary position and the drawbar 8 positioned in the advanced releasing position, as illustrated in FIG. 12. Hereby, the head portion 9 of the drawbar is received in the engagement bore 72 in the tool holder shank 71 and the engagement groove 74 in the tool holder shank 71 is positioned on the outside of the engagement flanges 27 of the engagement members 20. Thereupon, hydraulic oil is fed into the first hydraulic chamber 54a of each hydraulic actuator 50 in order to move the first piston members 52a in the first axial direction D and thereby achieve a corresponding axial movement of the connecting element 60 and the actuating member 13. During a first phase of this axial movement of the actuating member 13, the second pressure applying surface 44 on the actuating member 13 will slide and press against the second pressure receiving surfaces 43 on the wedges 31. Hereby, the wedges 31 will be pressed radially inwards and the drawbar 8 will be axially displaced towards the retracted locking position. Due to the relatively steep inclination 13 of the second pressure applying and receiving surfaces 44, 43, the wedges 31 will initially move inwards rather fast, which results in a relatively quick displacement of the drawbar 8. The relatively steep angle β is advantageous since the initial displacement of the drawbar 8 does not require much force. The first and second pressure applying surfaces 34, 44 and the first and second pressure receiving surfaces 33, 43 are so arranged that when the actuating member 13 has been moved such a distance that the second pressure applying surface 44 has passed the second pressure receiving surface 43 and the first pressure applying surface 34 reaches the first pressure receiving surface 33, i.e. at the transition between these respective surfaces, the drawbar 8 has almost reached its final destination at the rear end of the bore 5. Hence, for the final clamping phase, in which a large force is beneficial, the first pressure applying and receiving surfaces 34, 33 are active. In this phase, a relatively large movement of the actuating member 13 will result in a very small radial displacement of the wedges 31, and an even smaller axial displacement of the drawbar 8, which consequently will provide a force-amplifying effect that will make it possible for the drawbar 8 to pull the tool holder shank 71 with a large force into firm engagement with the spindle 2. Furthermore, the small inclination a of the first pressure applying and receiving surfaces 34, 33 will provide a self-locking effect and make sure that the clamping device will remain in the clamped state without requiring any additional locking means. Hereby, the hydraulic pressure on the first piston members 52a may be released when the drawbar 8 has reached the retracted locking position.

When a tool changing operation is to be performed and the tool holder 70 is to be released from the spindle 2, the rotation of the spindle 2 is stopped and hydraulic oil is fed into the second hydraulic chamber 54b of each hydraulic actuator 50 in order to move the second piston members 52b in the second axial direction, opposite to the first axial direction D, and thereby achieve a corresponding axial movement of the actuating member 13. When the actuating member 13 is subjected to a sufficient force in said second axial direction by the hydraulic actuators 50 and the connecting element 60, the self-locking frictional engagement between the first pressure applying surface 34 on the actuating member 13 and the first pressure receiving surfaces 33 on the wedges 31 will be released, whereupon the actuating member 13 is moveable in relation to the spindle 2 in the second axial direction under the effect of the hydraulic actuators 50. When the actuating member 13 is moved in this direction, the spring force exerted by the release spring 17 on the rear end of the drawbar 8 will push the drawbar axially towards the advanced releasing position. Hereby, the wedge engagement members 35 will exert a force on the wedges 31 and press them radially outwards. When the actuating member 13 has been moved a certain distance in the second axial direction, the release pressure applying surface 41 on the actuating member 13 will come into contact with the release pressure receiving surfaces 40 on the wedge engagement members 35, which will allow the actuating member 13 to exert an axial force on the drawbar 8 via the wedge engagement members 35 that will push the outer end of the head portion 9 of the drawbar 8 against a surface 75 in the engagement bore 72 in the tool holder shank 71 and thereby release the tool holder shank 71 from the spindle 2.

In the embodiment illustrated in FIGS. 14 and 15, the actuating member 13 consists of a body with a circular cross-sectional shape, which is slidably received in the bore 5 inside the spindle 2 so as to be moveable in relation to the spindle in the axial direction thereof. In this case, the connecting element 60 is fixed to the actuating member 13 so as to be moveable in relation to the spindle 2 in the axial direction thereof together with the actuating member 13, wherein the connecting element 60 is here also configured to rotate together with the actuating member 13 when the actuating member rotates together with the spindle 2. The central part 61 of the connecting element 60 is fixed to the actuating member 13 and the arms 62 of the connecting element project in radial direction from the actuating member 13 on opposite sides thereof. Apertures 29 for the arms 62 extend radially through a peripheral wall of the spindle 2 on opposite sides of the spindle, wherein each arm 62 extends across a respective one of these apertures 29. The apertures 29 are elongated and extend in the axial direction of the spindle 2 so as to allow the arms 62 to move in relation to the spindle 2 in the axial direction thereof. In the illustrated example, the connecting element 60 has the form of a transverse pin, wherein the arms 62 constitute opposite end sections of this pin. In this case, the central part 61 of the connecting element 60 extends across the actuating member 13 perpendicularly to the centre axis thereof.

In the embodiment illustrated in FIGS. 14 and 15, the outer end of each arm 62 is receivable with play in the interspace between the first and second piston members 52a, 52b of the hydraulic actuators 50, to thereby allow the piston members 52a, 52b to exert a pushing force on the connecting element 60 when each arm 62 is positioned in the interspace between the piston members 52a, 52b of a hydraulic actuator and also allow the connecting element 60 to rotate in relation to the piston members 52a, 52b of the hydraulic actuators together with the actuating member 13 and the spindle 2. When hydraulic fluid is fed into the first hydraulic chambers 54a, the first piston members 52a will push the connecting element 60 and thereby the actuating member 13 rearwards in the above-mentioned first axial direction D. When hydraulic fluid is fed into the second hydraulic chamber 54b, the second piston members 52b will push the connecting element 60 and thereby the actuating member 13 forwards in the opposite direction. In this embodiment, the actuating member 13 is configured to act on the motion transferring mechanism 30 via a projection 13a, which is fixed to the connecting element 13 and projects from a front side of the connecting element towards the front end 2a of the spindle 2. The motion transferring mechanism 30 included in the clamping device 1 according to FIGS. 14 and 15 is of the type described in U.S. Pat. No. 6,370,995 B1. Thus, the design and functioning of this motion transferring mechanism 30 is described in closer detail in U.S. Pat. No. 6,370,995 B1.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A clamping device arranged for releasably holding a tool holder shank, the clamping device comprising:
    a housing;
    a spindle rotatably mounted inside the housing and having a front end, a rear end and a bore which intersects the front end and extends rearwardly therefrom, wherein a mounting portion for receiving the tool holder shank is provided at a front end of the bore;
    a drawbar slidably mounted inside the bore so as to be reciprocally moveable in the bore along a longitudinal axis thereof between an advanced releasing position and a retracted locking position;
    a plurality of engagement members arranged around the drawbar at a front end thereof, wherein the engagement members, under the effect of a movement of the drawbar from the advanced releasing position to the retracted locking position, are moveable from a first position, in which the engagement members allow the tool holder shank to move into and out of said mounting portion of the bore, to a second position, in which the engagement members are in locking engagement with the tool holder shank and keep the tool holder shank secured to the spindle;
    an actuating member arranged inside the housing, wherein the actuating member is slidably mounted to the spindle so as to be moveable in relation to the spindle in the axial direction thereof,
    a motion transferring mechanism arranged inside the housing, wherein the motion transferring mechanism is mounted to the spindle and configured to transfer a movement of the actuating member in a first axial direction in relation to the spindle into a movement of the drawbar from the advanced releasing position to the retracted locking position;
    two or more hydraulic actuators arranged in or mounted on the housing on different sides of the spindle and configured to move the actuating member axially in relation to the spindle, wherein each hydraulic actuator includes one or more piston members, each of the piston members being slidably received in a space of the hydraulic actuator at the side of and at a distance from the spindle so as to be hydraulically moveable axially in this space in parallel with the longitudinal axis; and a connecting element at least partly arranged inside the housing and configured to form a connection in radial direction between the actuating member and the piston members of the hydraulic actuators, wherein the connecting element is configured to transfer an axial movement of the piston members in relation to the housing into a corresponding axial movement of the actuating member in relation to the spindle, wherein the connecting element includes a central part through which the connecting element is connected to the actuating member, and several arms, one for each hydraulic actuator, through which the connecting element is connected to the piston members of the hydraulic actuators, wherein each arm is fixed to the central part and projects from the central part in radial direction, and wherein each hydraulic actuator includes two piston members the two piston members being first and second piston members, the first and second piston members being arranged opposite each other and in alignment with each other, wherein each one of said first and second piston members has a first side facing the other piston member and an opposite second side facing away from the other piston member, wherein a first hydraulic chamber is formed in said space of the hydraulic actuator on the second side of the first piston member and a second hydraulic chamber is formed in this space on the second side of the second piston member, wherein each one of said arms of the connecting element has a part received in an interspace between the first and second piston members of the associated hydraulic actuator, and wherein the connecting element is moveable in said first axial direction by feeding of hydraulic fluid into the first hydraulic chamber of each hydraulic actuator and in an opposite second axial direction by feeding of hydraulic fluid into the second hydraulic chamber of each hydraulic actuator.

2. The clamping device according to claim 1, wherein the actuating member is configured to assume a self-locking axial position in or on the spindle when the drawbar has been forced into the retracted locking position under the effect of the actuating member and the motion transferring mechanism, so as to thereby keep the drawbar in the retracted locking position.

3. The clamping device according to claim 1, wherein said hydraulic actuators are two in number and arranged opposite each other on opposite sides of the spindle.

4. The clamping device according to claim 1, wherein the first and second piston members of each hydraulic actuator are fixedly connected to each other in order to be axially moveable together with each other.

5. The clamping device according to claim 4, wherein the first and second piston members of each hydraulic actuator are connected to each other via a shaft, which extends across the interspace between the first and second piston members and through a recess in the part of the arm received in this interspace.

6. The clamping device according to claim 5, wherein the connecting element is suspended on the shafts arranged between the first and second piston members of the hydraulic actuators.

7. The clamping device according to claim 6, wherein each of the shafts is received with play in the recess of the associated arm, wherein one or more elastic elements, are arranged around the shaft and fitted between the shaft and the arm inside the recess in order to provide an elastic connection between the connecting element and the shaft.

8. The clamping device according to claim 1, wherein each arm is configured to contact the contact surfaces on the opposed first sides of the first and second piston members of respective hydraulic actuator via contact surfaces on opposite sides of the part of the arm received in the interspace between the piston members, wherein said contact surfaces on the arm or said contact surfaces on the first and second piston members are convexly curved in order to provide linear contact between the arm and the piston members.

9. The clamping device according to claim 1, wherein the actuating member has a form of a sleeve, wherein the actuating member is arranged around a peripheral wall of the spindle and slidably mounted to this peripheral wall so as to be axially moveable in relation to the spindle, and wherein the actuating member is rotatable in relation to the connecting element together with the spindle.

10. The clamping device according to claim 9, wherein the actuating member extends through a recess with circular cross-sectional shape in a central part of the connecting element.

11. The clamping device according to claim 9, wherein the motion transferring mechanism includes two or more wedges spaced apart in the circumferential direction of the spindle, each wedge being received in a respective aperture that extends radially through said peripheral wall of the spindle, wherein the wedges are configured to press the drawbar towards the retracted locking position when they are pressed radially inwards in the associated apertures, wherein each wedge includes a first pressure receiving surface which faces outwards from the spindle, wherein the actuating member on its inner side is provided with a first pressure applying surface which faces inwards for contacting the first pressure receiving surface on each wedge, the first pressure applying surface having a radial distance to the longitudinal axis that increases as seen in said first axial direction, and wherein the first pressure applying surface is configured to press each wedge radially inwards in the associated aperture by pressing against the first pressure receiving surface on each wedge when the actuating member is moved in said first axial direction.

12. The clamping device according to claim 11, wherein the first pressure applying surface and the first pressure receiving surfaces are inclined in relation to the longitudinal axis by such an angle that the wedges will keep the actuating member in a self-locking axial position on the spindle when the drawbar has been forced into the retracted locking position under the effect of the actuating member and the wedges.

13. The clamping device according to claim 9, wherein the drawbar, under the effect of the actuating member and the motion transferring mechanism, is moveable from the advanced releasing position to the retracted locking position against the action of a spring force from a release spring arranged inside the spindle.

* * * * *